United States Patent [19]

Gellert

[11] Patent Number: 4,837,925
[45] Date of Patent: Jun. 13, 1989

[54] METHOD OF MANUFACTURE OF AN ELECTRICAL TERMINAL ON AN INJECTION MOLDING NOZZLE

[76] Inventor: Jobst U. Gellert, 7A Prince Street, Georgetown, Ontario, Canada, L7G 2X1

[21] Appl. No.: 261,732

[22] Filed: Oct. 24, 1988

[30] Foreign Application Priority Data

Sep. 30, 1988 [CA] Canada .................................. 578975

[51] Int. Cl.⁴ ........................................... H01C 17/28
[52] U.S. Cl. .......................................... 29/619; 29/611;
425/549; 219/541; 219/544; 174/74 R; 228/179
[58] Field of Search .......................... 29/611, 619, 621;
425/549, 568; 219/541, 542, 544; 174/74 R;
228/179

[56] References Cited

U.S. PATENT DOCUMENTS

| 1,170,723 | 2/1916 | Allerding | 174/180 |
|---|---|---|---|
| 2,003,175 | 5/1935 | Daly | 29/621 |
| 4,403,405 | 9/1983 | Gellert | 29/611 |
| 4,446,360 | 5/1984 | Gellert | 29/611 |
| 4,557,685 | 12/1985 | Gellert | 219/549 |
| 4,583,284 | 4/1986 | Gellert | 29/611 |
| 4,688,622 | 8/1987 | Gellert | 164/611 |
| 4,768,283 | 9/1988 | Gellert | 29/611 |
| 4,768,945 | 9/1988 | Schmitd et al. | 425/549 |

FOREIGN PATENT DOCUMENTS 532677 3/1987 Canada .
549517 10/1987 Canada .
549520 10/1987 Canada .

Primary Examiner—P. W. Echols
Attorney, Agent, or Firm—Riches, McKenzie & Herbert

[57] ABSTRACT

A method of making an electrically insulated terminal in an injection nozzle. After the heating element is wound in a spiral channel on the outer surface of the main body portion of the nozzle the rear end projects radially out an opening in the collar portion. The casing is stripped from the heating element to expose the resistance wire adjacent the rear end. A steel plug having a central bore therethrough is slipped over the projecting rear end and welded into place in the opening. A steel terminal body is made with a central bore and a threaded front portion to receive an external power lead. The casing of the portion of the heating element projecting from the plug and a rear portion of the terminal body are coated with insulating material. A protective cap is securely swaged over the coating on the rear portion. The assembled cap and body are slipped over the rear end of the heating element and welded to the matching front face of the plug. The exposed resistance wire is welded to the terminal body. This structurally secures the terminal body against torque from connecting and disconnecting the external lead and electrically insulates it from the rest of the nozzle, while electrically connecting it to the resistance wire. In an alternate embodiment, the connections are made while integrally brazing the nozzle in a vacuum furnace.

11 Claims, 4 Drawing Sheets

METHOD OF MANUFACTURE OF AN ELECTRICAL TERMINAL ON AN INJECTION MOLDING NOZZLE

BACKGROUND OF THE INVENTION

This invention relates generally to injection molding and more particularly to a method of making an injection molding nozzle with an improved terminal for the integral electric heating element.

Integral electric heating elements have a small diameter resistance wire which connects to a larger diameter conductor to provide a terminal to which the external electrical lead is connected. While the resistance wire of the heating element is electrically connected to the terminal, it must be electrically insulated from the nozzle along its length to avoid grounding. This must be accomplished while providing the terminal with sufficient structural strength to withstand failure due to torquing when the lead wire is connected or disconnected.

Injection molding nozzles having integral heating elements are well known in the art. The applicant's U.S. Pat. No. 4,768,283 discloses a method which provides a protective nickel coating over the heating element which is integrally embedded in a spiral channel. The Canadian patent application Ser. No. 549,517 entitled "Method of Manufacture of Injection Molding Nozzle having Grounded Heating Element Brazed into Pointed Tip", filed Oct. 16, 1987 by Jobst Ulrich Gellert and U.S. Pat. No. 4,768,945 to Schmidt et al. which issued Sept. 6, 1988 discloses grounding the heating element at the forward end of the pointed tip of the nozzle.

A variety of different terminal arrangements are also known in the art. For instance, the applicant's U.S. Pat. Nos. 4,403,405 which issued Sept. 13, 1983 and 4,446,360 (divisional) show a nozzle and method of making it having a terminal protected by a connector sleeve with sealing provided by a split washer assembly. Further developments are shown in the applicant's U.S. Pat. Nos. 4,557,685 and 4,583,284 (divisional) which issued Apr. 22, 1986. More recently, the applicant 's Canadian patent application Ser. No. 549,520 entitled "Method of Manufacture of Injection Molding Nozzle Electrical Terminal" which was filed on Oct. 16, 1987 discloses a method of making a nozzle with a terminal by connecting the rear end of the heating element to a stud and pouring molten insulating material around it. While all of these methods represented considerable improvements at the time, they have the disadvantages that a considerable number of steps are required to make the nozzle and the terminals do not have sufficient structural strength to prevent failure due to torque from the external lead being connected and disconnected.

SUMMARY OF THE INVENTION

Accordingly, it is an object of the present invention to at least partially overcome the disadvantages of the prior art by providing an efficient method of making an integral injection molding nozzle which electrically insulates the terminal from the nozzle body while providing sufficient structural strength to withstand torque from the external lead being connected and disconnected.

To this end, in one of its aspects, the invention provides a method of making an integral elongated heated injection molding nozzle with a forward end and a rear end to be seated in a well in a cooled mold with minimal contact bridging an insulative air space provided between the heated nozzle and the surrounding cooled mold, the nozzle having a melt bore extending therethrough from a central inlet at the rear end to convey pressurized melt received at the inlet towards at least one gate extending from the well to a cavity in the mold, the nozzle having a steel main body portion with a generally cylindrical outer surface extending from a steel collar portion adjacent the rear end, the method including the steps of integrally vacuum brazing the nozzle together with a portion of an electrical heating element brazed in a spiral channel extending around the cylindrical outer surface of the main body portion, the heating element having a resistance wire extending through an electrical insulating material in an outer casing and a rear end extending out through a radial opening in the collar portion to a terminal, with the improvement including forming a plug having a front face, an outer surface and a heating element bore extending therethrough and seating the plug in the radial opening in the collar portion by inserting the rear end of the heating element into the bore and sliding the plug to a position where it is seated in the radial opening with a rear end portion of the heating element projecting at least a predetermined minimum distance from the front face of the plug, forming a terminal body with a heating element bore extending centrally therethrough from a rear end to a front end, the terminal body having a front portion with a threaded outer surface adjacent the front end and a rear portion with an outer surface adjacent the rear end, stripping the outer casing and insulating material from the heating element to expose the resistance wire for a short distance adjacent the rear end, surrounding the casing of the rear end portion of the heating element projecting from the front face of the plug with insulating material and applying a thin coating of insulating material to the outer surface of the rear portion of the terminal body, forming a protective cap having an inner surface which matches the outer surface of the rear portion of the terminal body and an outer surface which matches the front surface of the plug, mounting the protective cap on the rear portion of the terminal body in position to protect the coating of insulating material and pressing the protective cap in place to prevent relative rotation between the cap and the terminal body, mounting the terminal body and the protective cap on the nozzle by inserting the rear end of the heating element into the heating element bore therethrough and sliding the terminal portion to a position wherein the outer surface of the protective cap abuts against the front face of the plug and securing the terminal body and the protective cap in that position, and electrically connecting the exposed resistance wire of the heating element adjacent the rear end to the front portion of the terminal body.

Further objects and advantages of the invention will appear from the following description taken together with the accompanying drawings.

DETAILED DESCRIPTION OF THE DRAWINGS

Figure 1:
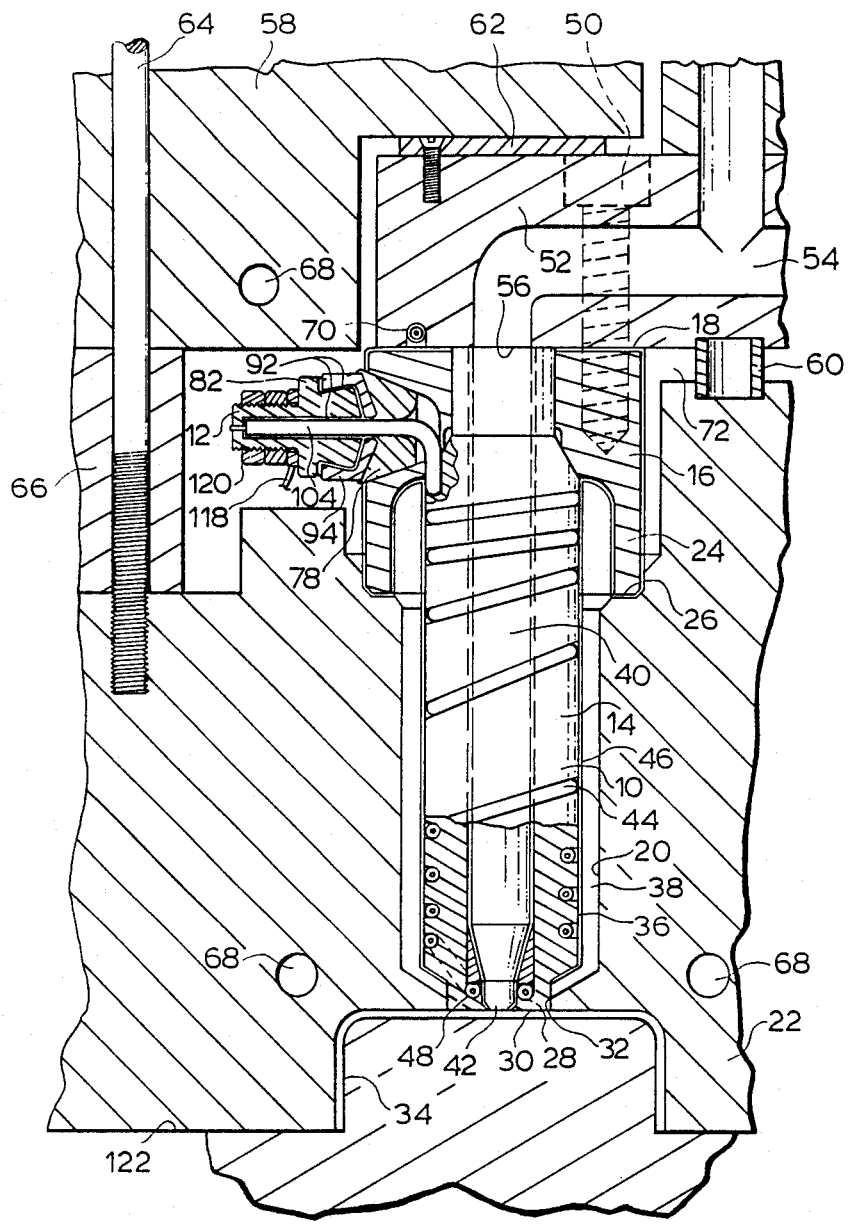
FIG. 1 is a sectional view of a portion of a multi-cavity injection molding system showing a nozzle having a terminal made according to a preferred embodiment of the invention.

Reference is first made to FIG. 1 which shows a portion of a sprue gated injection molding system having a number of heated nozzles 10 with an electrical terminal 12 made according to a preferred embodiment of the invention. Each nozzle 10 has a steel main body portion 14 extending from a steel collar portion 16 adjacent the back end 18. The nozzle 10 is seated in a well 20 in the cavity plate 22 by a circumferential insulation flange 24 which extends from the collar portion 16 and sits on a circumferential shoulder 26. The main body portion 14 of the nozzle has a nose portion 28 adjacent the forward end 30 which is received in an opening 32 through the cavity plate 22 leading to a cavity 34. :Thus, the nozzle 10 is accurately located in this position in which the cylindrical outer surface 36 of the main body portion 14 is separated from the surrounding cavity plate 22 by an insulative air space 38. In this embodiment, the nozzle 10 has a central melt bore 40 which leads to a gate 42 extending through the nose portion 28 to the cavity 34.

The nozzle is heated by an electrically insulated heating element 44 which is integrally brazed in a spiral channel in the outer surface 36 of the main body portion 14 and extends to the terminal 12 which projects outwardly or frontwardly from the collar portion 16 as described in more detail below. The heating element 44 in the channel is covered by a protective nickel coating 46 which is applied as described in the applicant's U.S. Pat. No. 4,768,283 which issued Sept. 6, 1988. In this embodiment, the heating element 44 has a forward end portion 48 which encircles the melt bore 40 adjacent the gate 42 in the nose portion 28 as described in detail in the applicant's U.S. patent application Ser. No. 260,920 filed Oct. 21, 1988 entitled "Injection Molding Nozzle having Nose Portion with Heating Element encircling the Bore and Method".

The nozzles 10 are secured by bolts 50 to a common elongated manifold 52 which has a melt passage 54 which branches to a number of outlets 56, each of which is aligned with the melt bore 40 through one of the nozzles 10. The manifold 52 is located securely in place between a back plate 58 and the cavity plate 22 by a central locating ring 60 and a titanium pressure pad 62. The back plate 58 is held in place by bolts 64 which extend through a support plate 66 into the cavity plate 22. The back plate 58 and the cavity plate 22 are cooled by pumping cooling water through cooling conduits 68. The manifold 52 is heated by an electric heating element 70 which is cast into it as described in the applicant's U.S. Pat. No. 4,688,622 entitled "Injection Molding Manifold Member and Method of Manufacture which issued Aug. 25, 1987. The locating ring 60 provides another insulative air space 72 between the heated manifold 52 and the cavity plate 22.

The rear end 74 of the heating element 44 extends radially outward through a central heating element bore 76 through a plug 78 which is secured in a radial opening 80 through the collar portion 16 of the nozzle 10. The terminal is provided by a terminal body 82 which has a front portion 84 with a threaded outer surface 86 and a rear portion 88 with an outer surface 90. The outer surface 90 of the rear portion 88 is covered by a thin coating 92 of an insulating material such as magnesium oxide and has a protective cap 94 secured to it. As can be seen the protective cap 94 has an inner surface 96 which matches the outer surface 90 of the rear portion 88 of the terminal body 82 and an outer surface 98 which matches the front face 100 of the plug 78 to which it is affixed. The heating element 44 has a nickel chrome resistance wire extending centrally through a refractory powder electrical insulating material such as magnusium oxide inside a steel casing 102. The heating element 44 has a rear end portion 104 which is received in a heating element bore 106 which extends through the terminal body 82 from the rear end 108 to the front end 110. The rear end portion 104 of the heating element 44 has the outer casing and the magnesium oxide stripped to expose the resistance wire 112 for a short distance adjacent the rear end 74. The exposed resistance wire 112 is received in a smaller diameter portion 114 of the bore 106 through the terminal body 82 to which it is electrically connected adjacent the front end 110. The remaining casing 102 of the rear end portion 104 of the heating element which is also covered by a thin coating 92 of the insulating material is received in a larger diameter portion 116 of the bore 106 through the terminal body. Thus, the terminal body 82 is structurally secure to withstand torque as an external lead 118 is connected to it or disconnected from it by nuts 120 on the threaded outer surface 86. Also, while the resistance wire 112 is electrically connected to the terminal body 82, it is electrically insulated by the insulating coatings 92 from the steel casing 102 and the protective cap 94.

In use, the system is assembled as shown in FIG. 1 and electrical power is applied through the lead 118 to the terminal 12 of the heating element 44 of each nozzle 10 and to the heating element 70 in the manifold 52 to heat the nozzles and the manifold to a predetermined operating temperature. Pressurized melt from a molding machine (not shown) is introduced into the melt passage 54 through the manifold 52 according to a predetermined cycle in a conventional manner. The pressurized melt flows through the melt bore 40 in each nozzle, through the gates 42 and fills the cavities 34. After the cavities 34 are filled, injection pressure is held momentarily to pack and then released. After a short cooling period, the mold is opened along the parting line 122 to eject the molded products. After ejection the mold is closed and injection pressure is reapplied to refill the cavities 34. This cycle is repeated continuously with a frequency dependent on the size and shape of the cavities and the type of material being molded.

Other than the terminal 12 which is made according to the present invention, the remainder of each nozzle 10 is made as described in detail in the applicant's U.S. patent application Ser. No. 260,920 filed Oct. 21, 1988 referred to above. Another embodiment of the nozzle can be made by the method disclosed in the applicant's U.S. Pat. No. 4,768,283 also referred to above. The nozzle is made by integrally brazing the collar portion 16 to the main body portion 14. They are assembled by tack welding them in place with a portion of the heating element 44 wound in the spiral channel in the outer surface 36 of the main body portion 14. Nickel brazing paste is applied to the joints and the assembly is sprayed with a binder such as acrylic lacquer and then dipped in agitated metallic powder such as nickel or an alloy thereof to coat the surfaces. The assembly is then heated in a vacuum furnace to a temperature of approximately 1925° F. and the furnace is evacuated to a relatively high vacuum to remove substantially all the oxygen. When the coating is heated, the binder is volatized, but the nickel alloy remains in place. Before the melting temperature of the nickel alloy is reached, the vacuum is reduced by partially backfilling with an inert gas such as argon or nitrogen. When the nickel alloy melts, it flows by capilliary action to integrally braze the assembly together and provide the protective nickel coating 46 on the surfaces. While the nozzles shown are made by the method described above, nozzles may also be made by the vacuum brazing or casting methods described by the applicant in U.S. Pat. No. 4,557,685 entitled "Heated Nozzle for Injection Molding Apparatus" which issued Dec. 10, 1985 and 4,583,284 (divisional) entitled "Method of Manufacture of Injection Molding Nozzle with Brazed in Heating Element" and Canadian patent application serial No. 532,677 filed Mar. 20, 1987 entitled "Injection Molding Nozzle and Method", whichever brazing method of making the nozzles is used, the present invention includes the additional steps described below to include an integral electrical terminal 12.

Referring now to FIGS. 2-7, the steps involved in providing the nozzle 10 with the terminal according to the invention will be described in detail. The plug 78 (seen in FIG. 7) is made of steel with an outer surface 124 which is tapered to match the inner surface 126 of the opening 80 through the collar portion 16. The plug 78 is made with the heating element bore 76 which extends centrally therethrough to the front face 100. In this embodiment, the plug 78 is made with a circumferential rim 128 which extends outwardly adjacent the front face 100 to facilitate assembly as described below.

The terminal body 82 is formed of steel with the front portion 84, rear portion 88 and central bore 106 as described above. The protective cap 94 is formed of steel with an inner surface 96 which matches the outer surface 90 of the rear portion of the terminal body and has a short central heating element bore which matches the bore 106 of the terminal body 82. The protective cap 94 also has an outer surface 98 which matches the front face 100 of the plug.

The steel casing 102 and magnesium oxide insulating powder are stripped to expose the resistance wire 112 for a short distance adjacent the rear end 74 of the heating element 44. After the heating element 44 has been wound in the spiral channel in the outer surface 36 of the main body portion 14 of the nozzle as described in the applicant's Canadian patent application serial No. filed Sept. 30, 1988, the rear end 74 of the heating element 44 projects out through the opening 80 through the collar portion 16. The plug 78 is then mounted by inserting the rear end 74 of the heating element into the bore 76 through the plug and sliding the plug to a position where it is seated in the opening 80 through the collar portion 16 of the nozzle. According to one embodiment of the invention the plug 78 is securely welded in this position in which the tapered outer surface 124 of the plug 78 abuts against the matching inner surface 126 of the opening 80 through the collar portion 16.

Figure 2:
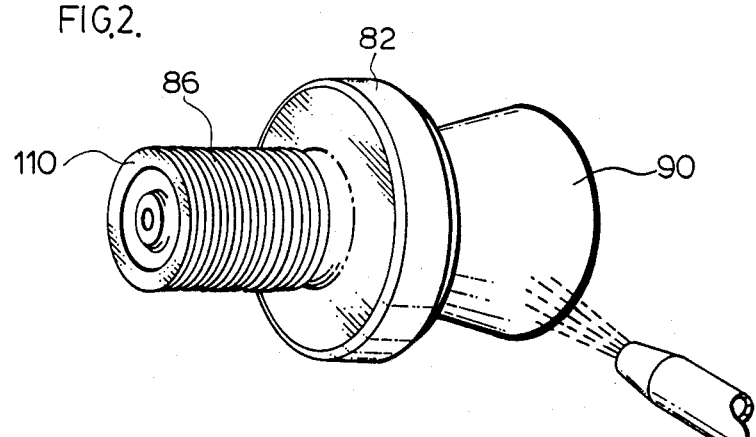
FIGS. 2-7 show the sequence of steps in making the nozzle with the terminal according to one embodiment of the invention.
Figure 3:
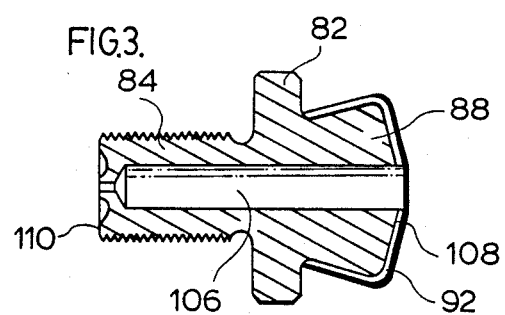

In this position a rear end portion 104 of the heating element 44 protrudes from the front face 100 of the plug. The steel casing 102 of this rear end portion 104 and the outer surface 90 of the rear portion 88 of the terminal body 82 are sprayed with the thin coating 92 of magnesium oxide or other suitable insulating material as shown in FIG. 2. While a plasma spray is shown according to the preferred embodiment, this coating may be carried out by dipping in a liquefied bath of insulating material. In an alternate embodiment, the steel casing 102 of the rear end portion 104 of the heating element can be covered by a sleeve or sleeves of insulating material.

Figure 4:
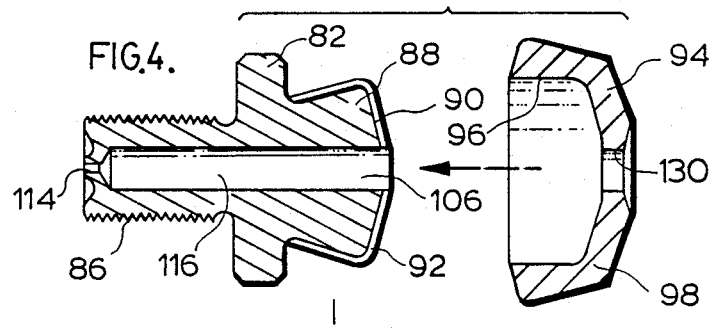
Figure 5:
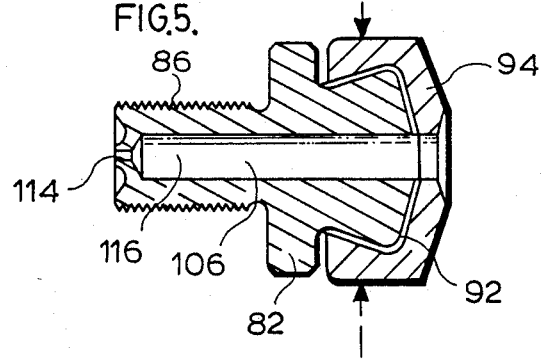
Figure 6:
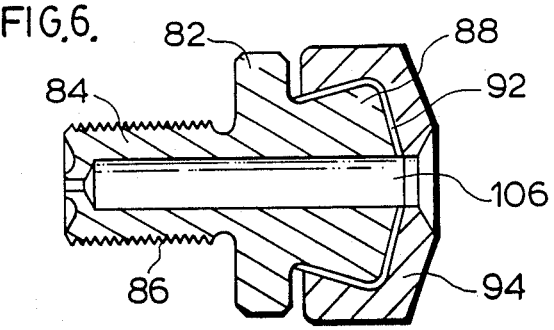
Figure 7:
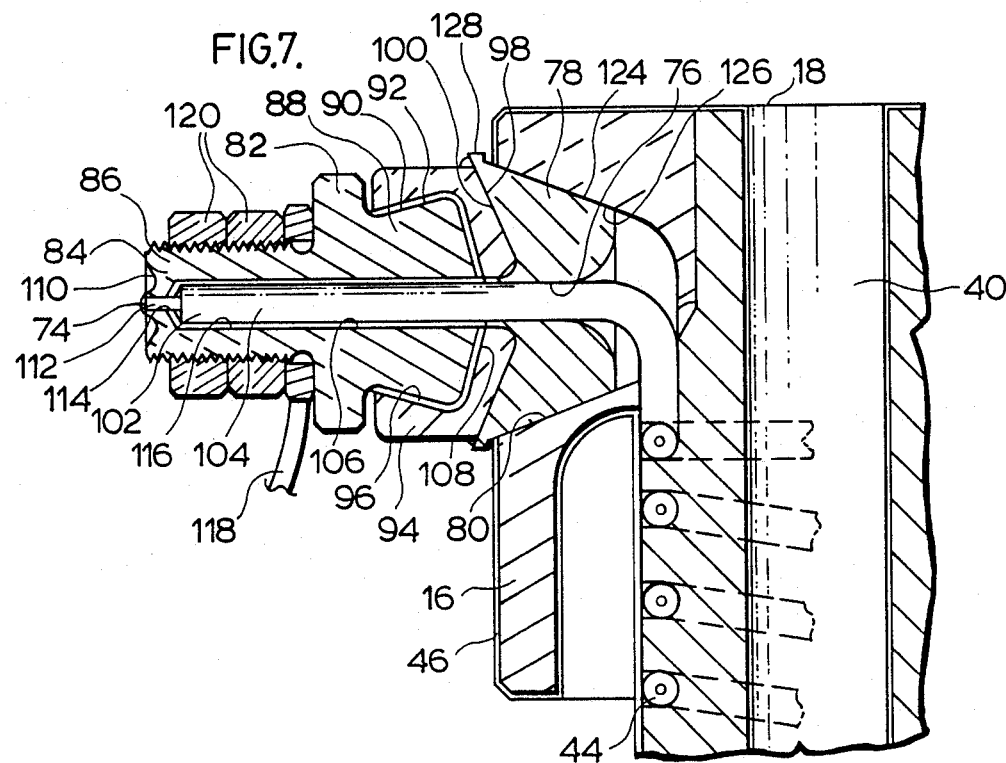

When the coating 92 has hardened, the protective cap 94 is mounted on the rear portion 88 of the terminal body as shown in FIGS. 4 and 5. After the cap 94 is slid over the outer surface 90 of the rear portion 88 to a position with the bore 130 aligned with the bore 106 of the terminal body 82, it is pressed securely into place tightly against the outer surface 90. As can be seen, in this embodiment the outer surface 90 is tapered inwardly towards the front so the inward pressing bends the cap 94 around the outer surface 90 to grip it securely. In this embodiment this inward pressing is carried out by swaging the cap into place, but it may be crimped or otherwise pressed inwardly tightly enough to ensure the cap 94 will securely hold the terminal body 82 without any rotation or wobbling, but not so tight as to penetrate the insulating coating 92 between them.

The assembled cap 94 and body 82 are then mounted in the nozzle 10 by inserting the rear end 74 of the heating element 44 into the heating element bore 106 and sliding them to a position in which the outer surface 98 of the cap 94 abuts against the front face 100 of the plug 78. As can be seen, in the position the exposed resistance wire 112 is received in the smaller diameter portion 114 of the bore 106 and the coated casing 102 of the rear end portion 104 of the heating element 44 is received in the larger diameter portion 116 of the bore 106. They are then secured in this position by welding the cap 94 to the front face 100 of the plug 78 adjacent the circumferential rim 128. The exposed resistance wire 112 is then welded at the front end 110 of the terminal body 82 to form an electrical connection between them. Thus, the terminal body 82 is securely mounted on the nozzle to readily withstand torque from the nuts 120 when connecting and disconnecting the external lead 118. The terminal body 82 is electrically connected to the resistance wire 112 at the rear end of the heating element, but is electrically insulated from the steel casing 102 and the protective cap 94 by the insulating coating 92.

Figure 8:
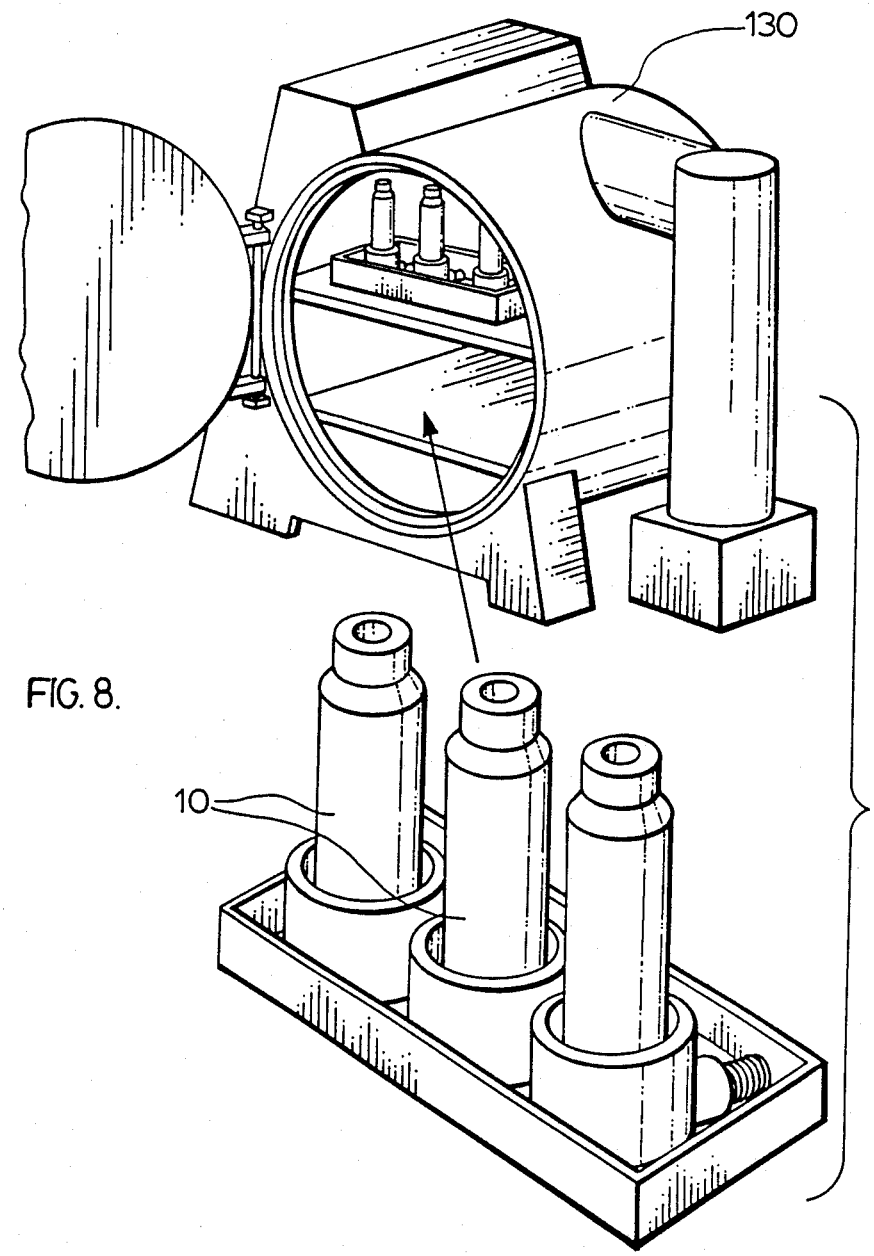
FIG. 8 shows a batch of assembled nozzles to be inserted in a vacuum furnace to secure the terminal according to another embodiment of the invention.

In an alternate embodiment of the invention the plug 78 and the assembled cap 94 and terminal body 82 are first tack welded to hold them in place and then brazed in a vacuum furnace 132 in the brazing step described above to be made an integral part of the nozzle. This involves running beads of nickel brazing paste along both sides of the circumferential rim 128 where the plug 78 joins the protective cap 94 and the collar portion 16 of the nozzle 10. Some brazing paste is also applied to the bore 106 at the front end 110 of the terminal body 82. When the nozzle is heated in the vacuum furnace as illustrated in FIG. 8, the paste melts and flows by capilliary action to integrally connect the exposed resistance wire 112 to the surrounding terminal body 82 and integrally join the plug 78, cap and terminal body 82 to the rest of the nozzle.

While the description of the steps involved in making an injection molding nozzle 10 with an improved electrical terminal 12 have been given with respect to preferred embodiments, it is not to be construed in a limiting sense. Variations and modifications will occur to those skilled in the art. For instance, it is apparent that the remainder of the nozzle may be made in a variety of different ways with a variety of different configurations. Furthermore, the steps according to the invention can be carried out in different sequences to provide manufacturing convenience and efficiency. The plug 78, cap 94 and body 82 can be made with different shapes, and different insulating materials can be used. Reference is made to the appended claims for a definition of the invention.

What I claim is:

1. In a method of making an integral elongated heated injection molding nozzle with a forward end and a rear end to be seated in a well in a cooled mold with minimal contact bridging an insulative air space provided between the heated nozzle and the surrounding cooled mold, the nozzle having a melt bore extending therethrough from a central inlet at the rear end to convey pressurized melt received at the inlet towards at least one gate extending from the well to a cavity in the mold, the nozzle having a steel main body portion with a generally cylindrical outer surface extending from a steel collar portion adjacent the rear end, the method including the steps of integrally vacuum brazing the nozzle together wit a portion of an electrical heating element brazed in a spiral channel extending around the cylindrical outer surface of the main body portion, the heating element having a resistance wire extending through an electrical insulating material in an outer casing and a rear end extending out through a radial opening in the collar portion to a terminal, the improvement including, (a) forming a plug having a front face, an outer surface and a heating element bore extending therethrough and seating the plug in the radial opening in the collar portion by inserting the rear end of the heating element into the bore and sliding the plug to a position where it is seated in the radial opening with a rear end portion of the heating element projecting at least a predetermined minimum distance from the front face of the plug, (b) forming a terminal body with a heating element bore extending centrally therethrough from a rear end to a front end, the terminal body having a front portion with a threaded outer surface adjacent the front end and a rear portion with an outer surface adjacent the rear end, (c) stripping the outer casing and insulating material from the heating element to expose the resistance wire for a short distance adjacent the rear end, (d) surrounding the casing of the rear end portion of the heating element projecting from the front face of the plug with insulating material and applying a thin coating of insulating material to the outer surface of the rear portion of the terminal body, (e) forming a protective cap having an inner surface which matches the outer surface of the rear portion of the terminal body and an outer surface which matches the front surface of the plug, (f) mounting the protective cap on the rear portion of the terminal body in position to protect the coating of insulating material and pressing the protective cap in place to prevent relative rotation between the cap and the terminal body, (g) mounting the terminal body and the protective cap on the nozzle by inserting the rear end of the heating element into the heating element bore therethrough and sliding the terminal portion to a position wherein the outer surface of the protective cap abuts against the front face of the plug and securing the terminal body and the protective cap in that position, and (h) electrically connecting the exposed resistance wire of the heating element adjacent the rear end to the front portion of the terminal body.

2. A method as claimed in claim 1 including forming the terminal body with the heating element bore having a first portion extending from the rear end to a second portion adjacent the front end, the first portion having a sufficient diameter to receive the coated casing of the rear end portion of the heating element therein and the second portion having a smaller diameter to receive the exposed resistance wire adjacent the rear end of the heating element therein.

3. A method as claimed in claim 2 including forming the outer surface of the rear portion of the terminal body tapered inwardly towards the front to securely hold the protective cap after it is pressed in place thereon.

4. A method as claimed in claim 3 including welding the exposed resistance wire of the heating element to the surrounding front portion of the terminal body to electrically connect them together.

5. A method as claimed in claim 4 including welding the protective cap to the plug to secure the terminal body and protective cap in place.

6. A method as claimed in claim 3 including applying brazing material along where the outer surface of the protective cap abuts against the front surface of the plug, around the outer surface of the plug, and to the exposed resistance wire in the heating element bore at the front end of the terminal body, and heating them in a vacuum furnace during the vacuum brazing step whereby the protective cap is integrally brazed to the plug, the plug is integrally brazed to the collar portion, and the resistance wire of the heating element is integrally connected to the front portion of the terminal body.

7. A method as claimed in claim 6 including tack welding the plug and the protective cap in place prior to brazing.

8. A method as claimed in claim 7 including making the plug with an outwardly projecting rim adjacent the front face to facilitate application of the brazing compound.

9. A method as claimed in claim 3 including spraying liquid insulating material onto the casing of the heating element and the outer surface of the rear portion of the terminal body.

10. A method as claimed in claim 3 wherein the insulating material is magnesium oxide.

11. A method as claimed in claim 3 including making the outer surface of the plug tapered to abut against a matching tapered surface of the radial opening in the collar portion.

* * * * *